United States Patent [19]

Ghignoni

[11] Patent Number: 5,337,055
[45] Date of Patent: Aug. 9, 1994

[54] METHOD AND EQUIPMENT FOR ADJUSTING A RADAR DETECTION THRESHOLD

[75] Inventor: Jean-François Ghignoni, Asnieres, France

[73] Assignee: Thomson-CSF, Puteaux, France

[21] Appl. No.: 121,636

[22] Filed: Sep. 16, 1993

[30] Foreign Application Priority Data

Sep. 18, 1992 [FR] France .............. 92 11144

[51] Int. Cl.$^5$ .................. G01S 7/292; G01S 7/34
[52] U.S. Cl. ...................... 342/93; 342/159
[58] Field of Search .......... 342/91, 92, 93, 159, 342/195, 198, 205

[56] References Cited

U.S. PATENT DOCUMENTS

| | | | |
|---|---|---|---|
| 4,536,764 | 8/1985 | Freeman | 342/91 |
| 4,665,402 | 5/1987 | Young | 342/91 |
| 4,956,792 | 9/1990 | Sekine | 342/91 X |
| 4,970,660 | 11/1990 | Marchant | 342/90 X |

FOREIGN PATENT DOCUMENTS 0062519  4/1982  European Pat. Off. .

*Primary Examiner*—John B. Sotomayor
*Attorney, Agent, or Firm*—Oblon, Spivak, McClelland, Maier & Neustadt

[57] ABSTRACT

This invention makes use of the technique known as CFAR (Constant False Alarm Rate). Its objective is to create a method of adjusting the detection threshold of a radar consisting in:

breaking down the area monitored by the radar in one sweep period, into sectors in which clutter can be assumed to be uniform, creating the histogram y(x) of received signal amplitudes in a sub-sample of distance-direction cells in each sector, in each sector, estimating the clutter histogram using a model m(x) defined analytically with coefficients adjusted so as to follow the shape of the recorded histogram y(x) at least in part of its variation interval, and calculating the value of the detection threshold S in each sector starting from a set value of the false alarm probability Pfa and the model analytical equation using the relation:

$$Pfa = \frac{1}{N} \int_s^\infty m(x)dx$$

where N is the total number of events contained in the modeled histogram. The invention is particularly appropriate for adjustment of the detection threshold of a marine patrol radar.

13 Claims, 2 Drawing Sheets

METHOD AND EQUIPMENT FOR ADJUSTING A RADAR DETECTION THRESHOLD

BACKGROUND OF THE INVENTION

This invention concerns adjustment of a radar detection threshold to minimize parasite echoes known under the general term of clutter, while minimizing desensitization of the radar to avoid the loss of interesting targets. It makes use of the technique known as CFAR (Constant False Alarm Rate). It is particularly concerned with adjustment of the target extraction threshold from a panoramic marine patrol radar.

In radar technique, an observable target is a target that creates an echo with an amplitude exceeding that of the surrounding noise. In order to distinguish it from the noise, a detection threshold has to be fixed lower than the amplitude of its echo and higher than the amplitude of the surrounding noise. Given the random nature of the noise, this threshold is defined as a function of an acceptable false alarm rate that we attempt to make constant, despite the various probability density functions that may represent clutter, and particularly sea clutter.

In order to use a radar reception signal, the signal is sampled over a period of time and samples are grouped by category each concerning a single cell corresponding to a given radar pointing direction and a given target distance in this pointing direction. A known manner of adjusting the detection threshold in a distance-direction cell is to evaluate the average value of the signal received on distance-direction cells surrounding the distance-direction cell considered for a given pointing direction and lower and higher distances, and to use two to four times this average value as a detection threshold.

This method of calculating the detection threshold has the disadvantage that it requires many calculations for a panoramic radar with a high number of distance-direction cells. Also in the case of a marine patrol radar, powerful coastal echoes increase the value of the detection threshold thus making the radar less sensitive in coastal areas.

In order to reduce the number of calculations, we could envisage breaking down the area monitored by the radar into sectors each containing several distance-direction cells within which clutter remains uniform and using a detection threshold S for each sector representing a set value of the false alarm probability Pfa. This could be done by defining a clutter histogram for each sector that, assuming that signals returned by interesting targets are the exception, becomes coincident with the histogram relating possible values, x, of signal moduli received by the radar for the sector considered with their appearance frequencies, y, and determining the threshold S using the relation defining the false alarm rate Pfa that is the limit of the following integral when the total number N of events contained in the histogram tends towards infinity:

$$\frac{1}{N} \int_s^\infty y(x) dx$$

Unfortunately if it is required to limit the amount of calculation, the number of events contained in the histogram has to be limited such that the behavior of the histogram is not sufficiently accurate for high values of received signal moduli to be able to deduce a significant threshold value using the following relation:

$$Pfa = \frac{1}{N} \int_s^\infty m(x) dx$$

If the probability density function f(x) describing clutter is known, this difficulty can be overcome by replacing the histogram y(x) in the relation defining the false alarm probability Pfa by the probability density function f(x). We obtain:

$$Pfa = \int_s^\infty f(x) dx$$

This is a known averaging method, known as "cell average" that is used when the main source of clutter is thermal noise and the probability density function is of the Rayleigh type $$f(x) = \frac{2x}{m_2} \exp(-x^2/m_2)$$

where $m_2$ is the root mean square. In this method, the average is calculated on each sector and the root mean square of the clutter is deduced using a ratio of 1.25, such that the applicable Rayleigh function can be defined, and the threshold S is then obtained from tables of values containing results obtained from using relation (1) for the various possible values of the set false alarm probability and the root mean square.

However this cell averaging method can not be used in the case of a marine patrol radar subject to non-uniform clutter that depends on sea conditions and the direction of the prevailing wind, and for which the probability density function satisfies a log-normal type function at low radar distances particularly when the sea is rough, and a Rayleigh type function beyond a given "transition" distance. Moreover, it does not solve the problem caused by coastal echoes since they are too numerous in some sectors to remain an exception and have a non-negligible influence on the root mean square of received signal moduli assigned to clutter.

SUMMARY OF THE INVENTION

The purpose of the present invention is to compensate for the various disadvantages mentioned, and in particular to overcome the difficulty due to inadequate knowledge of the behavior of the clutter histogram for high values of the received signal modulus due to an insufficient number of contained events. It consists in measuring the shape of the clutter histogram in the low and medium range of the received signal modulus, and interpolating its shape in the high range of received signal modulus using an analytically defined model that agrees well with the measured part of the clutter histogram in the low and medium range of the received signal modulus and for which the behavior for high values of the received signal modulus is similar to the behavior of Rayleigh, Gaussian or log-normal type functions.

Its purpose is to provide a method of adjusting a radar detection threshold consisting of the following steps:

breaking down the area monitored by the radar in one sweep period into sectors, for each sector, defining the histogram y(x) relating various possible values, x, of signal moduli received by the radar in the sector considered during a sweep period, to their appearance frequencies, y, approximating the measured histogram y(x) for each sector using at least one model m(x) that is defined analytically by equation with variable x including an exponential function on a polynomial in x and/or a polynomial in the logarithm of x, in which the coefficients are adjusted so as to minimize differences between the model m(x) and the measured histogram y(x), and for each sector, deducing the value S of the radar detection threshold corresponding to a given value of the false alarm probability Pfa, using the relation with the model:

$$PfaxN = \int_{s}^{\infty} m(x)dx$$

where N is the total number of values of received signal moduli contained in the model.

In general the model m(x) is defined analytically by an equation of the following type:

$$m(x) = \exp\left[\sum_{i} a_i \ln^i(x) + \sum_{j} b_j x^j\right]$$

In practice, the model need only be defined by the reduced equation:

$$m_5(x) = \exp[a_2 l_n^2(x) + a_2 \ln(x) + c + b_2 x^2 + b_1 x]$$

Reduced to an equation of the following form:

$$m_2(x) = \exp[a_2 l_n^2(x) + a_1 \ln(x) + a_0]$$

the model may simulate a log-normal type function $$y = \frac{1}{ax} \exp\left[-\frac{(\ln(x) - \beta)^2}{\gamma}\right]$$

whereas when reduced to an equation of the form $$m_3(x) = \exp[a_1 \ln(x) + c + b_2 x^2]$$

the model can simulate a Rayleigh type function:

$$y = \frac{x}{\delta} \exp\left(-\frac{x^2}{\delta}\right)$$

Another purpose of the invention is a radar using the method described above.

BRIEF DESCRIPTION OF THE DRAWINGS

Other characteristics and advantages of the invention will become clear in the following description of several methods of implementation, given only as examples. This description will be made with reference to the drawing in which.

DESCRIPTION OF THE PREFERRED EMBODIMENT

Figure 1:
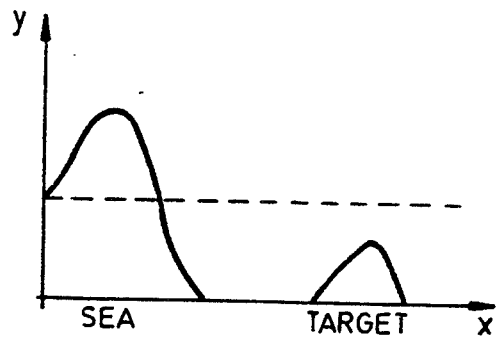
FIG. 1 illustrates a typical histogram shape as it could be recorded by listing received signal amplitudes in distance-direction cells in a radar sweep sector containing essentially sea clutter and a few marine targets.

The objective is to control the false alarm rate for a radar facing the sea, in other words to overcome disturbing echoes generated by sea return or sea clutter among the mosaic of elementary distance-direction cells into which a radar breaks down its field of surveillance.

It is well known that sea clutter is non-uniformly distributed within the monitored area, and in particular is much denser on the leeward side. It also satisfies a probability density function with a variable shape depending on the height of the waves and the angle at which they are seen by the radar. It thus satisfies a log-normal type probability density function of the form:

$$y = \frac{1}{ax} \exp\left[-\frac{\ln(x/b)^2}{c}\right]$$

at low distances from the radar, particularly when the sea is rough, and a Rayleigh type probability density function $$y = \frac{x}{a} \exp\left(-\frac{x^2}{a}\right)$$

beyond a given "transition" distance after which waves seen by the radar hide each other. For more details about sea clutter, refer to "Radar Handbook" by Merril I.SKOLNIK, published by Mc Graw-Hill.

Elimination of sea clutter also raises the problem of coastal echoes that must not be confused with it, otherwise the value of the detection threshold will be artificially high and the radar will be less sensitive in coastal areas.

In order to take account of non-uniformity of sea clutter within the area monitored by the radar, this area is broken down into sufficiently small sectors to obtain some uniformity, but without going down to the level of distance-direction cells, and values of detection threshold levels used in these sectors are such that a common set value of the false alarm probability can be respected. For example, the surveillance area of a radar can be broken down by dividing each complete revolution into 18 degree wide sectors with a depth equal to one tenth of the range, each containing several tens of thousands of distance-direction cells.

Lack of knowledge of the probability density function f(x) respected by sea clutter in a sector makes it impossible to deduce the value S of the level of the detection threshold for the definition relation that relates it to the false alarm probability value Pfa:

$$Pfa = \int_s^\infty f(x)dx$$

However this difficulty may be overcome and the value of the detection threshold level may be obtained using the relation:

$$Pfa = \lim_{N\to\infty} \frac{1}{N} \int_s^\infty y(x)dx$$

where y(x) is the sea clutter histogram in the sector considered and N is the number of events contained in the histogram. Although the general shape y(x) of the sea clutter histogram is not known in the sector considered, it can be extrapolated starting from its local behavior in the interval containing the most frequently appearing sea clutter signal amplitudes, which is an interval in which the sea clutter histogram becomes coincident with the received signal amplitudes histogram on a sub-sample of distance-direction cells for the sector considered when this sub-sample contains several thousand distance-direction cells.

We take advantage of the fact that the influence of sea clutter can be separated from the influence of target or coastal echoes within this variation interval in the received signal amplitudes histogram in a sub-sample of distance-direction cells for the sector considered, in order to extract this variation interval and use it to model the general shape of the sea clutter histogram using an analytically defined curve m(x).

In order to implement this method, after having broken down the maritime radar surveillance area into sectors each containing several tens of thousands of distance-direction cells, a sub-sample of sectors is adopted using at least 2000 distance-direction cells in each sector, and for each sector a histogram is plotted relating received signal amplitudes to their frequencies of appearance in the sub-sample of distance-direction cells. Since the received signal demodulated by the radar is in complex form with a phase component and a quadrature component, its modulus is used as amplitude. Moreover, since this received signal may have been processed in various ways before being used in distance-direction cells, the recorded histogram may start with a series of zeros that would disturb the model and is eliminated by recentering consisting of translating the recorded histogram such that the first retained received signal amplitude becomes equal to one.

After recording the histogram of received signal amplitudes for a sub-sample of distance-direction cells in the sector considered, the variation interval corresponding to the most frequently received signal amplitudes is selected in this histogram, making sure that it is solely due to sea clutter.

Figure 2:
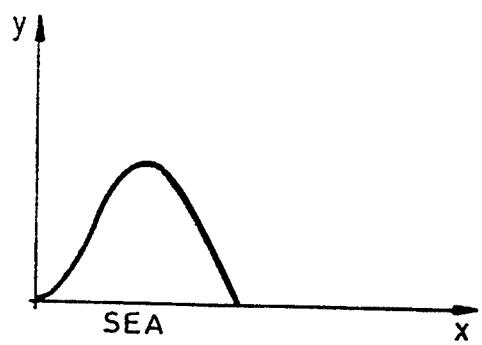
FIG. 2 illustrates the shape of the histogram in FIG. 1 under the effect of a sub-sample of distance-direction cells in the sector considered.

FIG. 1 illustrates a typical histogram shape plotted on a logarithmic event frequency scale, as it could appear by including signal amplitudes received in all distance-direction cells in a sector of the maritime surveillance area of a radar containing sea clutter and a small number of large amplitude marine target echoes, but no coastal echo. This shape has two peaks. The first peak which is by far the largest, contains low amplitudes of frequently occurring received signals due solely to sea clutter, and the second peak which is much smaller, contains infrequently received higher amplitude signals due mainly to marine targets. A horizontal dashed line shows the effect of the sub-sample of distance-direction cells that reduces the number of contained distance-direction cells by a certain ratio, which is equivalent to raising the abscissa axis since the ordinate is the event frequency shown on a logarithmic scale. This has the effect of attenuating the first peak due to sea clutter and making the second peak due to marine targets almost disappear, such that using the sub-sample we obtain the histogram shape shown in FIG. 2 which only shows the first peak due to sea clutter. In practice the histogram for the sub-sample may contain two peaks, one large peak due to sea clutter and the other much smaller peak generated by sea target echoes, but these two peaks are always separated by an interval without any samples that can be used to terminate the selected variation interval. The variation interval on which the recorded histogram corresponds to the sea clutter histogram is thus selected by determining the maximum received signal amplitude x encountered with the highest appearance frequency $y_{max}$ and taking the first abscissa value with an amplitude of at least $x_{max}/2$ as the start of the variation interval, and the first abscissa value greater than $x_{max}$ for which the value of the appearance frequency cancels out as the end of the variation interval.

Figure 3:
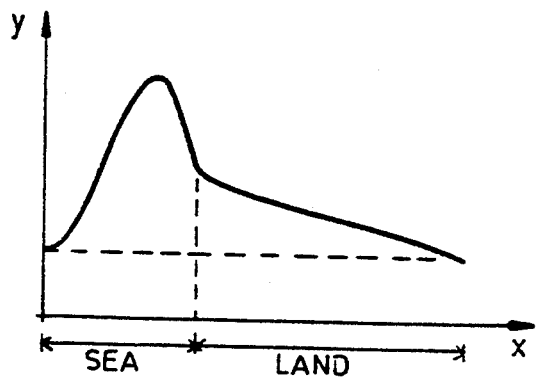
FIG. 3 shows a typical histogram shape as it could be recorded by listing received signal amplitudes in distance-direction cells in a radar sweep sector containing mostly sea clutter and coastal echoes.

FIG. 3 shows another typical histogram shape, plotted with a log frequency scale as ordinate, that could be recorded by including received signal amplitudes in all distance-direction cells in a maritime area sector of a radar surveillance containing mostly sea clutter and a few coastal echoes or land clutter. This shape has only one peak due to low values of the frequently appearing received signals generated by sea clutter. The base of this peak due to sea clutter is extended on the high received amplitude signal side, by land clutter that shows up as high amplitude echoes with variable power.

Figure 4:
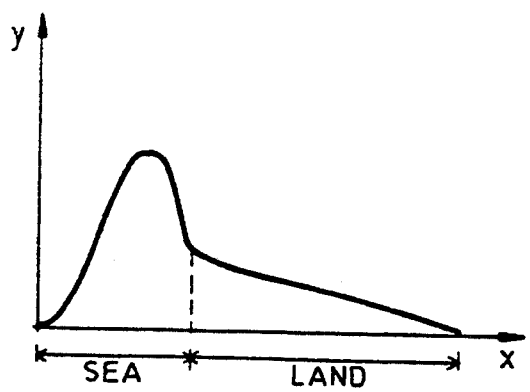
FIG. 4 illustrates the shape of the histogram in FIG. 3 under the effect of a sub-sample of distance-direction cells for the sector considered.

As in FIG. 1, a horizontal dotted line plotted in FIG. 3 shows the effect of the sub-sample of distance-direction cells in the sector considered. Sub-sampling reduces the number of distance-direction cells included by a certain ratio, and is equivalent to lifting the abscissa axis since the ordinate is plotted on a log frequency scale. This has the result of attenuating the height of the histogram peak without modifying its widened base due to the contribution of land clutter which does not disappear from the new histogram obtained shown on FIG. 4. Thus if we accept the criterion determined above for a sector without any coastal area for the choice of a variation interval, the selected variation interval will be unsuitable since it will be partly influenced by land clutter.

In order to avoid this disadvantage, the criterion for choosing the end of the variation interval is modified by observing that the selected variation interval should be stopped at the characteristic slope change that occurs at the start of the contribution of land clutter to the deformation of the peak generated by sea clutter in the received signal amplitudes histogram on a sub-sample of distance-direction cells in the sector considered.

In order to detect this slope change in the measured histogram, we will consider the part of the histogram between the point at which the abscissa corresponds to the most frequently encountered amplitude value $x_{max}$ and the maximum possible amplitude value for the received signal, and this part of the histogram is smoothed by averaging over a sliding window several points wide, followed by a calculation of the first derivative at the current point and comparing the derivative obtained at the current point with the average derivative obtained over several previous points, and a slope change is detected when the derivative at the current point exceeds the average of the derivatives obtained over several previous points by a given percentage.

If the selected variation interval proves to be too small, for example less than 20 values of received signal amplitudes, the process is stopped and the detection threshold level in the sector considered is determined using the usual averaging method.

After having found the received signal amplitudes histogram on a sub-sample of distance-direction cells for a sector, and after isolating a sufficiently wide variation interval in this histogram corresponding to the most frequently received signal amplitudes and representing almost exclusively sea clutter, we go on to model the sea clutter histogram using an adjusted analytic model in order to follow the shape of the histogram obtained from the sub-sample, in the said selected variation interval.

Since we are now dealing with sea clutter, we will model its histogram by an analytic model that may have the shape of a Rayleigh type or log-normal type function. This model is generally defined by the following equation in x:

$$m(x) = \exp\left[\sum_i a_i l_n^i(x) + \sum_j b_j x^j\right]$$

where $a_i$ and $b_j$ are adjustable coefficients.

Reduced to an equation of the form:

$$m_1(x) = \exp[a_2 l_n^2(x) + a_1 \ln(x) + a_0]$$

the model may simulate a log-normal type function. We obtain:

$$\ln[m_1(x)] = a_2 l_n^2(x) + a_1 \ln(x) + a_0$$

Hence:

$$\ln\left[\frac{m_1(x)}{x^{a_1}}\right] = a_2 l_n^2(x) + a_0$$

$$m_1(x) = x^{a_1} \exp[a_2 l_n^2(x) + a_0]$$

that may be rearranged into the following form after changing coefficients:

$$m_1(x) = \frac{1}{\lambda x} \exp\left[-\frac{(\ln(x) - \beta)^2}{\gamma}\right]$$

Reduced to an equation of the form:

$$m_2(x) = \exp[a_1 \ln(x) + c + b_2 x^2]$$

the model can simulate a Rayleigh function. We obtain:

$$\ln[m_2(x)] = a_1 \ln(x) + c + b_2 x^2$$

hence:

$$\ln\left[\frac{m_2(x)}{x^{a_2}}\right] = c + b_2 x^2$$

$$m_2(x) = x^{-a_2} \exp(b_2 x^2 + c)$$

that may be put into the following form by making a suitable choice of coefficients:

$$y = \frac{x}{\delta} \exp\left(-\frac{x^2}{\delta}\right)$$

Coefficients are chosen so as to minimize the root mean square error. Let $y_k$, $x_k$ be the coordinates of points in the selected variation interval in the received signal amplitudes histogram obtained from the sub-sample of distance-direction cells for the sector considered. The root mean square error e of the model is equal to:

$$e = \sum_k [y_k - m(x_k)]^2$$

This is minimized by using the least squares method to adjust coefficients $a_i$ and $b_j$ in the model m(x) so as to cancel out its derivatives with respect to the various coefficients. We thus obtain a system of equations:

$$\frac{de}{da_0} = 0$$

$$\frac{de}{da_1} = 0$$

.
.
.

$$\frac{de}{db_0} = 0$$

$$\frac{de}{db_1} = 0$$

.
.
.

from which the various coefficients can be determined.

Using this least squares method, determination of the model coefficients reduces to the equation $$m_3(x) = \exp[a_2 l_n^2(x) + a_1 \ln(x) + c + b_2 x^2]$$

that enables it to simulate a Rayleigh type function and a log-normal type function, and involves solving the following matrix system:

$$\begin{bmatrix} \Sigma x^4 & \Sigma x^2 & \Sigma x^2 \ln(x) & \Sigma x^2 l_n^2(x) \\ \Sigma x^2 & n & \Sigma \ln(x) & \Sigma l_n^2(x) \\ \Sigma x^2 \ln(x) & \Sigma \ln(x) & \Sigma l_n^2(x) & \Sigma l_n^3(x) \\ \Sigma x^2 l_n^2(x) & \Sigma l_n^2(x) & \Sigma l_n^3(x) & \Sigma l_n^4(x) \end{bmatrix} \begin{bmatrix} b_2 \\ c \\ a_1 \\ a_2 \end{bmatrix} =$$

$$\begin{bmatrix} \Sigma x^2 \ln(y) \\ \Sigma \ln(y) \\ \Sigma \ln(x)\ln(y) \\ \Sigma l_n^2(x)\ln(y) \end{bmatrix}$$

where n is equal to the number of samples ($y_k$, $x_k$) and the various summations taken on variable k varying from 1 to n.

For model:

$$m_1(x) = \exp[a_2 l_n^2(x) + a_1 \ln(x) + a_0]$$

that only simulates log-normal type functions, determination of the coefficients using the least squares method involves solving the following matrix system:

$$\begin{bmatrix} n & \Sigma \ln(x) & \Sigma l_n^2(x) \\ \Sigma \ln(x) & \Sigma l_n^2(x) & \Sigma l_n^3(x) \\ \Sigma l_n^2(x) & \Sigma l_n^3(x) & \Sigma l_n^4(x) \end{bmatrix} \begin{bmatrix} a_0 \\ a_1 \\ a_2 \end{bmatrix} = \begin{bmatrix} \Sigma \ln(y) \\ \Sigma \ln(y)\ln(x) \\ \Sigma \ln(y) l_n^2(x) \end{bmatrix}$$

that can be simplified by making a variable change:

$$u = \ln(x) \quad v = \ln(y)$$

and becomes:

$$\begin{bmatrix} n & \Sigma u & \Sigma u^2 \\ \Sigma u & \Sigma u^2 & \Sigma u^3 \\ \Sigma u^2 & \Sigma u^3 & \Sigma u^4 \end{bmatrix} \begin{bmatrix} a_0 \\ a_1 \\ a_2 \end{bmatrix} = \begin{bmatrix} \Sigma v \\ \Sigma v \cdot u \\ \Sigma v \cdot u^2 \end{bmatrix}$$

which is an expression for a regression on the polynomial $$a_2 \cdot u^2 + a \cdot u + a_0$$

using the least square method of order 2.

We also note that for a model $$m_4(x) = \exp[\ln(x) + b_2 x^2 + b \cdot x + b_0]$$

that can be put into the form:

$$m_4(x) = x \exp[b_2 x^2 + b_1 x + b_0]$$

a variable change of the type $$w = \ln(y/x)$$

can reduce the determination of model coefficients to a polynomial regression using the least squares method of order 2, that is more easily implemented than the general method.

This means that there are several methods of modeling the clutter histogram and determining the value of the detection threshold.

In the first method, the clutter histogram is modeled using a fairly general equation model:

$$m_3(x) = \exp[a_2 l_n^2(x) + a_1 \ln(x) + c + b_2 x^2]$$

in which coefficients $a_2$, $a_1$, c and $b_2$ are adjusted as described above. The detection threshold S is then estimated using the following relation:

$$Pfa = \frac{1}{N} \int_S^\infty m_3(x) dx$$

where N is the total number of events contained in the modeled histogram.

The second method consists in modeling the clutter histogram using the general equation model:

$$m_5(x) = \exp[a_2 l_n^2(x) + a_1 \ln(x) + c + b_2 x^2 + b_1 x]$$

in which the coefficients are adjusted based on the least squares criterion. We then determine which coefficient $a_2$ or $b_2$ is most significant. If $a_2$ is more significant, the model is simplified using the definition equation:

$$m_1(x) = \exp[a_2 l_n^2(x) + a_1 \ln(x) + a_0]$$

in which the coefficients $a_2$, $a_1$, $a_0$ are readjusted using the least squares criterion. If $b_2$ is more significant, the model is simplified using the definition equation:

$$m_4(x) = x \exp[b_2 x^2 + b_1 x + b_0]$$

in which coefficients $b_2$, $b_1$, $b_0$ are adjusted using the least squares criterion. Finally the detection threshold S is estimated using the relation:

$$Pfa = \frac{1}{N} \int_S^\infty m(x) dx$$

where m(x) is the model chosen $m_1(x)$ or $m_4(x)$ and N is the total number of events contained in the modeled histogram.

The advantage of the second method is that models $m_1$ and $m_4$ are simpler than model $m_5$. Since the sea return equation is temporarily stable, the coefficients of the general model $m_5$ may be calculated less frequently than the coefficients for the particular models $m_1$ or $m_4$. For example it would be possible to calculate the coefficients of the general model $m_5$ and then make the resulting choice of a particular model $m_1$ or $m_4$ every p radar sweep revolutions, where p is greater than one, and then calculate the coefficients of the chosen particular model $m_1$ or $m_4$ every revolution.

The third method is to model the clutter histogram using the two particular models $m_1$ and $m_4$ in parallel.

$$m_1(x) = \exp[a_2 l_n^2(x) + a_1 \ln(x) + a_0]$$

$$m_4(x) = x \exp[b_2 x^2 + b_1 x + b_0]$$

in which the coefficients are determined using the least squares criterion. A choice is then made to determine which of the two particular models $m_1$ and $m_4$ has the lowest root mean square error from real values found in the selected variation interval in the histogram obtained from the sub-sample in order to estimate the detection threshold S using the relation:

$$Pfa = \frac{1}{N} \int_S^\infty m(x) dx$$

where m(x) is the chosen model $m_1(x)$ or $m_4(x)$ and N is the total number of events contained in the modeled histogram.

In summary, the method proposed for the determination of set values for a sweep radar detection threshold consists in breaking down the area surveyed by the radar into sectors each containing several tens of thousands of distance-direction cells, and calculating a value of the detection threshold for each sector using the following procedure:

1. Sub-sample the sector so as to consider not more than about ten thousand distance-direction cells.
2. Create the histogram relating the various received signal amplitudes to their frequencies of appearance in the distance-direction cell sub-sample.
3. Select a variation interval in the histogram that has just been created for clutter, where this variation interval generally includes the values of the most frequently occurring received signal amplitudes.
4. Estimate the general shape of the clutter histogram using a model m(x) defined analytically and adjusted so as to follow the shape of the histogram created from the sub-sample, within the selected variation interval.
5. Calculate the value of the detection threshold S making use of the set false alarm probability value Pfa using the relation:

$$Pfa = \frac{1}{N} \int_S^\infty m(x)dx$$

where N is the total number of events contained in the modeled histogram.

The general form of model m(x) is:

$$m(x) = \exp\left[\sum_i a_i l_n^i(x) + \sum_j b_j x^j\right]$$

It may be in the form:

$$m_1(x) = \exp[a_2 l_n^2(x) + a_1 \ln(x) + a_0]$$

It is then adapted to the log-normal function. It may also be of the form:

$$m_2(x) = \exp[a_1(x) + c + b_2 x^2]$$

It is then adapted to the Rayleigh function. It may also be of the form:

$$m_3(x) = \exp[a_2 l_n^2(x) + a_1 \ln(x) + c + b_2 x^2]$$

It is then adapted to the log-normal and Rayleigh functions. It may also be of the more general form:

$$m_5(x) = \exp[a_2 l_n^2(x) + a_1 \ln(x) + c + b_2 x^2 + b_1 x]$$

It is then adapted to the exponential, log-normal, Gaussian and Rayleigh functions.

The choice of the model or models to be used depends on the type of clutter. Note however that as the number of coefficients in the model increases, the more it tends to diverge towards infinity as x increases. It is therefore preferable to use models containing a small number of coefficients to extrapolate the clutter histogram.

Figure 5:
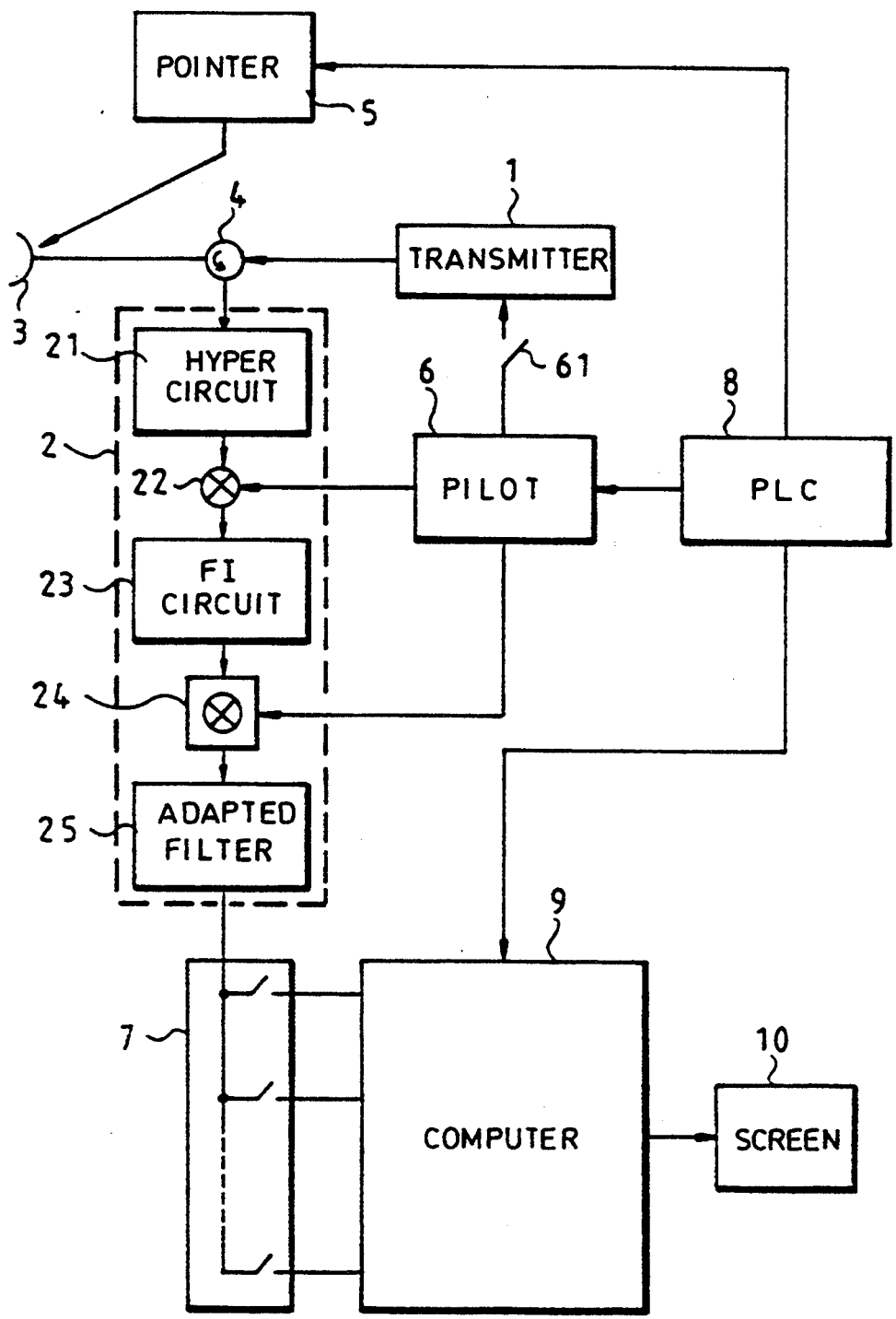
FIG. 5 diagrammatically shows the composition of a consistent pulse radar making use of the detection threshold adjustment method according to the invention.

FIG. 5 shows the schematic for a coherent pulse radar, with a transmission channel and a reception channel, adapted to implementation of the method of adjusting the detection threshold described above. This radar contains a transmitter 1 and a receiver 2 coupled to a transmission reception antenna 3 through a duplexer 4.

A pointing direction circuit 5 provides antenna 3 with direction commands that the antenna executes either mechanically or electronically so as to cover a given sweep range.

A pilot circuit 6 outputs a carrier wave to transmitter 1 broken down into pulses through a chopping circuit 61 and various demodulation carriers to receiver 2.

Receiver 2 conventionally includes a high frequency circuit 21 connected to reception output of duplexer 4, a high frequency demodulator 22 excited by pilot circuit 6 and that transfers the signal output by hyper frequency circuit 21 to an intermediate frequency band, an intermediate frequency circuit 23 connected to the output from the high frequency demodulator 22, an amplitude-phase demodulator 24 placed after the intermediate frequency circuit 23 and excited by pilot circuit 6 that outputs phase and quadrature components of reception echoes in the video band, and a filter 25 adapted to the shape of transmitted interrogation pulses and connected to the output of the amplitude-phase demodulator 24.

Receiver 2 is normally followed by a distance sampling unit 7 that switches the received signal to one of a number of different parallel channels as a function of its delay with respect to the last interrogation pulse transmitted.

The radar also contains a programmable logic controller (PLC) 8 and a computer 9 with a display screen 10. The PLC 8 controls the pilot circuit 6 so as to have the radar transmit streams of successive interrogation pulses called recurrences, and the direction circuit 5 so as to have the antenna 3 sweep the area monitored by the radar. The computer 9 receives the various distance channels from the distance sampling unit 7, and PLC 8 receives information about timing and the rate of interrogation pulses transmitted and the antenna direction. It is typically capable, under the control of PLC 8, of distributing complex samples consisting of the phase component and the quadrature component of the received, demodulated and sampled signal, available on distance channels, into distance-direction cells each corresponding to a given antenna direction and to a given target distance in this direction, and is capable of calculating moduli of complex signal samples contained in the distance-direction cells, carrying out a post-integration of the said moduli over the duration of one recurrence, and displaying distance-direction cells containing a signal for which the modulus exceeds a given threshold referred to as the detection threshold, on display screen 10.

The computer is also capable of the following to determine values of the detection threshold:
  putting groups of distance-direction cells into sectors, partitioning the area monitored by the radar,
  for each sector, determining the histogram y(x) relating possible values x of signal moduli received by the radar in the sector considered in one sweep period, with their appearance frequencies y in a sub-sample of distance-direction cells in the sector considered,
  selecting a variation interval in the histogram y(x), containing values of moduli appearing the most frequently and corresponding almost exclusively to sea clutter, approximating the selected variation interval using at least one model defined analytically by an equation m(x) with variable x containing an exponential function on a polynomial in a logarithm of x and/or a polynomial in x, and determining a value of a detection threshold S for each sector in operation, starting from a set value of the false alarm probability Pfa using the relation:

$$Pfa = \frac{1}{N} \int_s^\infty m(x)dx$$

where N is the total number of received signal modulus values contained in the model.

The computer may be made using specialized circuits for the various functions described above, or more simply using suitably programmed microprocessor circuits.

What is claimed is:

1. Method for adjusting a radar detection threshold, which consists in:

breaking down the area monitored by the radar in one sweep period into sectors, for each sector, determining the histogram y(x) relating the possible values x of signal moduli received by the radar in the sector considered during one sweep period, with their frequencies of appearance y, approximating the histogram y(x) measured for each sector by means of at least one model m(x) defined analytically by an equation of variable x containing an exponential function on a polynomial of log x and/or a polynomial of x, in which the coefficients are adjusted so as to minimize the differences between the model m(x) and the measured histogram, and for each sector, deducing the value S of the radar detection threshold, starting from a set value of the false alarm probability value Pfa by using the relation with the model:

$$PfaxN = \int_s^\infty m(x)dx$$

where N is the total number of values of received signal moduli contained in the model.

2. Method according to claim 1, wherein the histogram y(x) for a sector is created starting from a sample of values x of signal moduli received by the radar in the sector considered during one sweep period.

3. Method according to claim 1, wherein after creating a histogram and before its approximation by at least one model, it also consists in keeping in the histogram only those points located within a variation interval around the maximum appearance frequency, referred to as the validity interval.

4. Method according to claim 3, wherein said variation interval limiting the histogram starts with the smallest value of the received signal modulus appearing with a frequency equal to half the maximum frequency of appearance of a value of the received signal modulus, and ends at the smallest value of the received signal modulus that is both higher than that with the maximum frequency of appearance and for which the frequency of appearance becomes zero.

5. Method according to claim 3, wherein slope changes are detected on the side of the histogram closest to the highest values of received signal moduli, and the variation interval is stopped at the first detected slope change.

6. Method according to claim 5, wherein histogram slope changes are detected by smoothing by averaging on a sliding window several points wide followed by a calculation of the first derivative of the smoothed histogram and detection of the discontinuity when the derivative of the current point differs from the average of several previously calculated derivatives by a certain percentage.

7. Method according to claim 1, wherein model $m_5(x)$ used is defined analytically by the following equation:

$$m_5(x) = \exp[a_2 l_n^2(x) + a_1 \ln(x) + c + b_2 x^2 + b_1 x]$$

where $a_1$, $a_2$, $b_1$, $b_2$ and c are coefficients adjusted so as to minimize the differences between the model and the measured histogram.

8. Method according to claim 1, wherein the model used $m_3(x)$ is defined analytically by the equation:

$$m_3(x) = \exp[a_2 l_n^2(x) + a_1 \ln(x) + c + b_2 x^2]$$

where $a_1$, $a_2$, $b_2$ and c are adjusted so as to minimize the differences between the model and the measured histogram.

9. Method according to claim 7, wherein, before using the model to determine the value of the detection threshold, its coefficients $a_2$ and $b_2$ are compared so as to keep only the most influential and correct the model over several consecutive sweep periods either to the form $$m_1(x) = \exp[a_2 l_n^2(x) + a_1 \ln(x) + a_0]$$

or to the form $$m_2(x) = \exp[a_1 \ln(x) + c + b_2 x^2].$$

10. Method according to claim 1, wherein two models are used, one defined analytically by the relation:

$$m_1(x) = \exp[a_2 l_n^2(x) + a_1 \ln(x) + a_0]$$

where $a_0$, $a_1$, $a_2$ are coefficients adjusted so as to minimize differences between the model and the measured histogram and the other is defined analytically by the equation:

$$m_6(x) = x \exp(d_2 x^2 + d_1 x + d_0)$$

where $d_0$, $d_1$, $d_2$ are coefficients adjusted so as to minimize differences between the model, and wherein the measured histogram and the model with the smallest differences from the measured histogram is used to determine the detection threshold.

11. Method according to claim 1, in which the model used is defined analytically by the following equation:

$$m_1(x) = \exp[a_2 l_n^2(x) + a_1 \ln(x) + a_0]$$

wherein the following variable changes are made in order to determine the values of coefficients $a_2$, $a_1$ and $a_0$ minimizing differences between the model and the measured histogram y(x):

$$u = \ln(x) \text{ et } v = \ln(y)$$

followed by a polynomial regression using the least squares method of order 2.

12. Method according to claim 1 using a model defined analytically by the following equation:

$$m_4(x) = x \exp(b_2 x^2 + b_1 x + b_0)$$

wherein, in order to determine values of the coefficients $b_0$, $b_1$, $b_2$ minimizing the differences between the model and the measured histogram, the following variable change is applied:

$$w = \ln(y/x)$$

followed by a polynomial regression using the least squares method of order 2.

13. Pulse radar for implementation of the process according to one of the previous claims, comprising a transmitter transmitting interrogation pulses through an antenna in order to scan the area monitored by the radar, a receiver, a distance gate unit connected to the receiver output and that switches the received signal to one of several parallel channels as a function of its lag behind the most recently transmitted pulse and therefore the distance of the obstacle at the origin of the returned echo, and a computer connected to the outputs of the distance gate unit and the direction controller capable of controlling the distribution of complex samples comprising a phase component and a quadrature component of the received, demodulated and sampled signal available at the output of the distance gate unit, into distance-direction cells covering the area monitored by the radar, the said radar being characterized by the fact that is also includes means of:

grouping distance-direction cells into sectors partitioning the area monitored by the radar, defining a histogram y(x) for each sector relating possible values x of signal moduli received by the radar in the sector considered in a sweep period, with their frequencies of appearance in distance-direction cells in the sector considered, approximating the measured histogram y(x) for each sector using at least one model m(x) defined analytically by an equation of the variable x containing an exponential function on a polynomial of log x and/or a polynomial of x, for each sector, deducing the value S of the radar detection threshold, a set value of the false alarm probability Pfa using the relation with the following analytical model definition:

$$PfaxN = \int_s^\infty m(x)dx$$

where N is the total number of values of received signal moduli contained in the model.

* * * * *